(12) United States Patent
Kawano et al.

(10) Patent No.: US 11,520,642 B2
(45) Date of Patent: Dec. 6, 2022

(54) TASK MANAGEMENT DEVICE AND TASK MANAGEMENT METHOD

(71) Applicant: TOYOTA JIDOSHA KABUSHIKI KAISHA, Toyota (JP)

(72) Inventors: Kentaro Kawano, Toyota (JP); Atsushi Watanabe, Nisshin (JP); Youichi Suzuki, Toyota (JP); Takashi Agari, Toyota (JP); Ryosuke Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 15/929,184

(22) Filed: Dec. 11, 2019

(65) Prior Publication Data

US 2020/0233727 A1 Jul. 23, 2020

(30) Foreign Application Priority Data

Jan. 23, 2019 (JP) .............................. JP2019-009568

(51) Int. Cl.
*G06F 9/54* (2006.01)
*G06F 9/48* (2006.01)
(Continued)

(52) U.S. Cl.
CPC ............ *G06F 9/542* (2013.01); *G06F 9/3855* (2013.01); *G06F 9/4881* (2013.01); *G06F 16/437* (2019.01); *G08G 1/093* (2013.01)

(58) Field of Classification Search
CPC combination set(s) only.
See application file for complete search history.

(56) References Cited

U.S. PATENT DOCUMENTS 6,041,239 A * 3/2000 Reed ..................... H04W 16/18
455/438
6,957,128 B1 * 10/2005 Ito ........................ G08G 1/0962
340/425.5

(Continued)

FOREIGN PATENT DOCUMENTS

JP 08-095802 A 4/1996
JP 2007237913 A * 9/2007

(Continued)

OTHER PUBLICATIONS

Partial English translation of Notification of Reason(s) for Refusal dated Apr. 5, 2022 in Japanese Patent Application No. 2019-009568, 4 pages.

*Primary Examiner* — S. Sough
*Assistant Examiner* — Phuong N Hoang
(74) *Attorney, Agent, or Firm* — Oblon, McClelland, Maier & Neustadt, L.L.P.

(57) ABSTRACT

In a task management device, an acquisition unit is configured to acquire vehicle information from a vehicle. A task management unit is configured to generate instruction information on priorities of a plurality of tasks executed by an in-vehicle multimedia device based on the vehicle information. A communication unit is configured to transmit to the multimedia device the instruction information for executing the task. The task management unit is configured to derive the priorities of the plurality of tasks based on the vehicle information, and to generate the instruction information on the derived priorities of the tasks.

11 Claims, 3 Drawing Sheets

(51) Int. Cl.
*G08G 1/09* (2006.01)
*G06F 16/435* (2019.01)
*G06F 9/38* (2018.01)

(56) References Cited

U.S. PATENT DOCUMENTS

| | | | |
|---|---|---|---|
| 10,217,069 B2* | 2/2019 | Scicluna | G06Q 50/30 |
| 2002/0095367 A1* | 7/2002 | Mizunuma | G06Q 40/04 |
| | | | 705/37 |
| 2014/0096234 A1* | 4/2014 | Zafiroglu | G06F 21/6218 |
| | | | 726/17 |
| 2016/0328272 A1* | 11/2016 | Ahmed | G06F 9/4881 |
| 2016/0371895 A1* | 12/2016 | Jayanthi | H04M 1/72403 |
| 2018/0340785 A1* | 11/2018 | Upadhyay | G01C 21/3617 |
| 2019/0159237 A1* | 5/2019 | Wei | H04W 4/40 |
| 2019/0232891 A1* | 8/2019 | Ishigooka | G06F 3/0622 |
| 2019/0342739 A1* | 11/2019 | Shah | G01C 21/3492 |
| 2019/0378475 A1* | 12/2019 | Lim | B60R 16/02 |
| 2019/0387410 A1* | 12/2019 | Bialer | H04W 16/02 |
| 2020/0143499 A1* | 5/2020 | Erdem | G06Q 10/06315 |
| 2020/0160712 A1* | 5/2020 | Beaurepaire | G08G 1/143 |
| 2020/0184576 A1* | 6/2020 | Rayes | G06Q 10/06315 |

FOREIGN PATENT DOCUMENTS

| | | |
|---|---|---|
| JP | 2018-160017 A | 10/2018 |
| WO | WO 2007/010683 A1 | 1/2007 |

* cited by examiner

| REGION | LOAD (DAYTIME) | LOAD (NIGHTTIME) |
|--------|----------------|------------------|
| A | MEDIUM | LOW |
| B | HIGH | MEDIUM |
| C | LOW | MEDIUM |
| ... | ... | ... |

TASK MANAGEMENT DEVICE AND TASK MANAGEMENT METHOD

INCORPORATION BY REFERENCE

The disclosure of Japanese Patent Application No. 2019-009568 filed on Jan. 23, 2019 including the specification, drawings and abstract is incorporated herein by reference in its entirety.

BACKGROUND

1. Technical Field

The present disclosure relates to a task management device and a task management method, capable of managing priorities of tasks executed by an in-vehicle multimedia device.

2. Description of Related Art

Japanese Unexamined Patent Application Publication No. 08-095802 (JP H08-095802 A) discloses a multitask processing device in which various parameters for determining a task execution order are set for each task, a priority is determined based on the set parameters, and the task is executed based on the priority. The multitask processing device determines the priority for each task based on two parameters, including a rank according to communication destination and a level according to communication content, to manage a communication task.

SUMMARY

An in-vehicle device receives traffic information from a beacon device provided on a road and notifies an occupant of the traffic information. Since the traffic information is input to the in-vehicle device by an interruption, it increases a processing load of the in-vehicle device. Depending on a traveling situation of a vehicle, the frequency of the interruption created by the traffic information may be high and processing load of the in-vehicle device become excessively high.

The multitask processing device according to JP-H08-095802 A determines the priority of the task based on the predetermined rank and level, thus in a case where such a device is mounted on the vehicle, there is a possibility of inappropriately setting the priority of the task depending on the traveling situation of the vehicle.

The present disclosure provides a mechanism capable of appropriately setting a priority of a task in a device for multitask processing based on the priority of the task, with consideration of such a problem.

According to an aspect of the present disclosure, in order to solve the problem stated above, a task management device includes an acquisition unit configured to acquire vehicle information from a vehicle, a task management unit configured to generate instruction information for setting priorities of a plurality of tasks executed by an in-vehicle multimedia device based on the vehicle information, and a communication unit configured to transmit the generated instruction information to the multimedia device.

Another aspect of the present disclosure is a task management method. The method includes a step of acquiring vehicle information from a vehicle, a step of generating instruction information for setting priorities of a plurality of tasks executed by an in-vehicle multimedia device based on the vehicle information, and a step of transmitting the generated instruction information to the multimedia device.

According to the present disclosure, it is possible to provide a mechanism capable of appropriately setting a priority of a task in a device for multitask processing based on the priority of the task.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
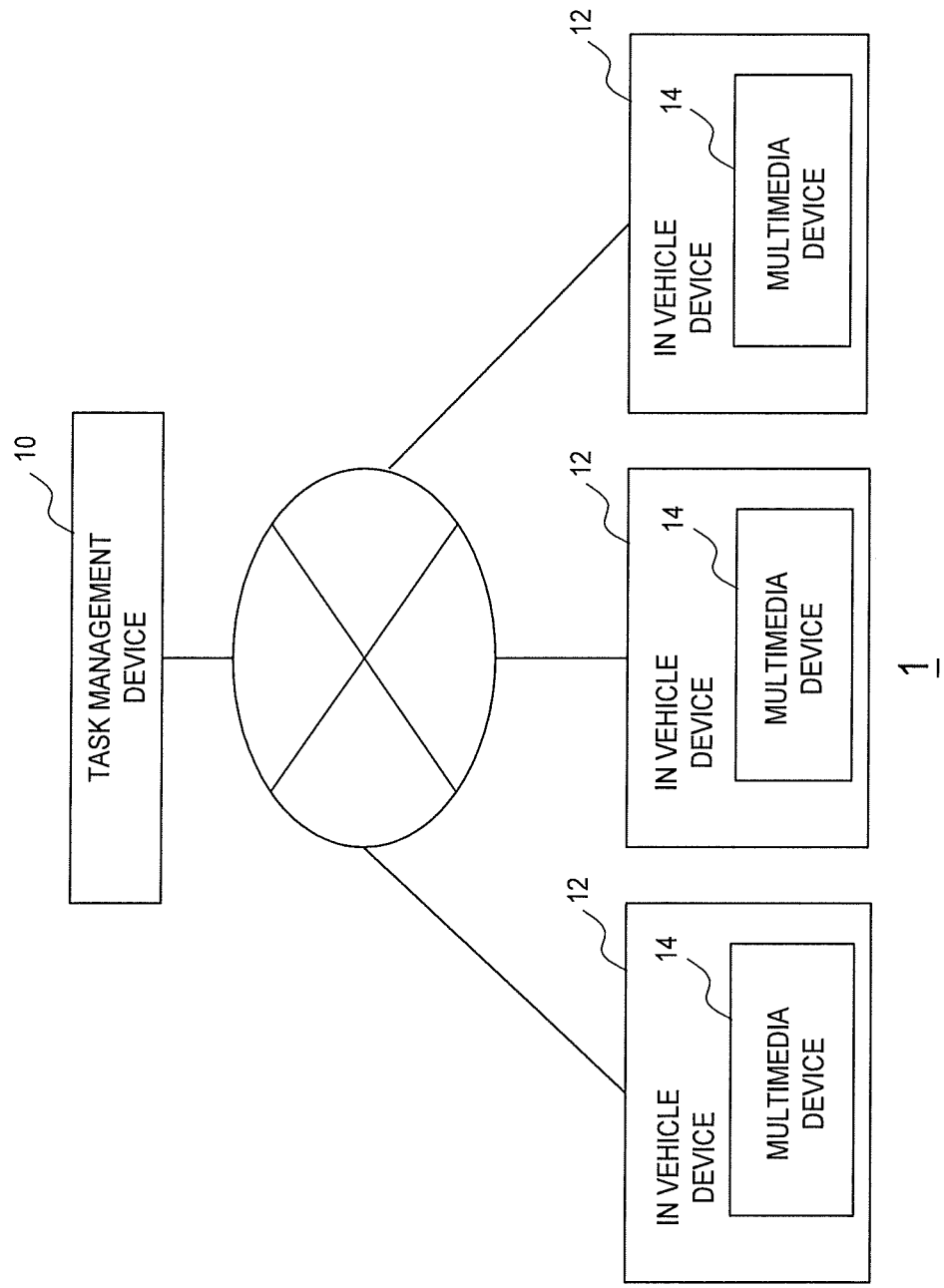
FIG. 1 is a diagram illustrating an overview of a task management system according to an embodiment.

FIG. 1 is a diagram illustrating an overview of a task management system 1 according to an embodiment. The task management system 1 includes a server-side task management device 10 and a plurality of in-vehicle devices 12 connected to the task management device 10 via a network. The in-vehicle device 12 includes at least a multimedia device 14 mounted on a vehicle.

The multimedia device 14 is capable of executing a plurality of media functions, which outputs information to an occupant by an output unit, such as an in-vehicle display, a speaker, and an alarm device as the media function is executed. The multimedia device 14 is configured by combining a plurality of media functions. The media functions are for outputting at least one of character data, image data, and audio data, and include, for example, an audio function, a navigation function, a video playback function, and a traffic information notification function.

The multimedia device 14 acquires several types of vehicle information, and outputs a result based on the vehicle information by the output unit. The vehicle information includes data acquired by in-vehicle devices, such as audio data, operation information by the occupant, camera images, and detected information acquired by an in-vehicle sensor, and data acquired from the outside, such as radio data, global positioning system (GPS) information, electronic toll collection system (ETC) information, and beacon information.

The multimedia device 14 executes a plurality of media functions by multitasking, and processes the plurality of tasks in parallel based on a priority. Priorities are set for each of the tasks, and resources of a central processing unit (CPU) and a memory are allocated for the tasks in accordance with the priorities.

The traffic information, such as ETC and beacon information, among the several types of vehicle information input to the multimedia device 14 when the vehicle travels, is input by an interruption and is preferentially processed. As the frequency of the interruption increases, a processing load of the multimedia device 14 also increases because resources are allocated to the interruption. For example, the interruption is frequently created by the traffic information in urban areas, and the processing load of the multimedia device 14 tends to increase. In regions where traffic congestion or a disaster occurs, the processing load of the multimedia device 14 may increase as the navigation function provides route guidance to avoid a point of traffic congestion or a disaster. Further, the processing load of the multimedia device 14 may also increase due to factors, such as traveling on a highway and the time range in which the vehicle travels.

Therefore, the task management device 10 manages the priorities of the tasks in the multimedia device 14 in order to prevent the processing load of the multimedia device 14 from becoming excessively high. The priority of the task can be quickly adjusted in accordance with a driving environment of each vehicle as the server-side task management device 10 performs task management, compared to a case where the processing of reducing the processing load of the multimedia device 14 is executed after the processing load increases. Further, since the task management device 10 can collectively perform the task management for vehicles traveling in a predetermined region, the load is reduced compared to a case where the in-vehicle device 12 individually manages the tasks in accordance with the driving environment.

Figure 2:
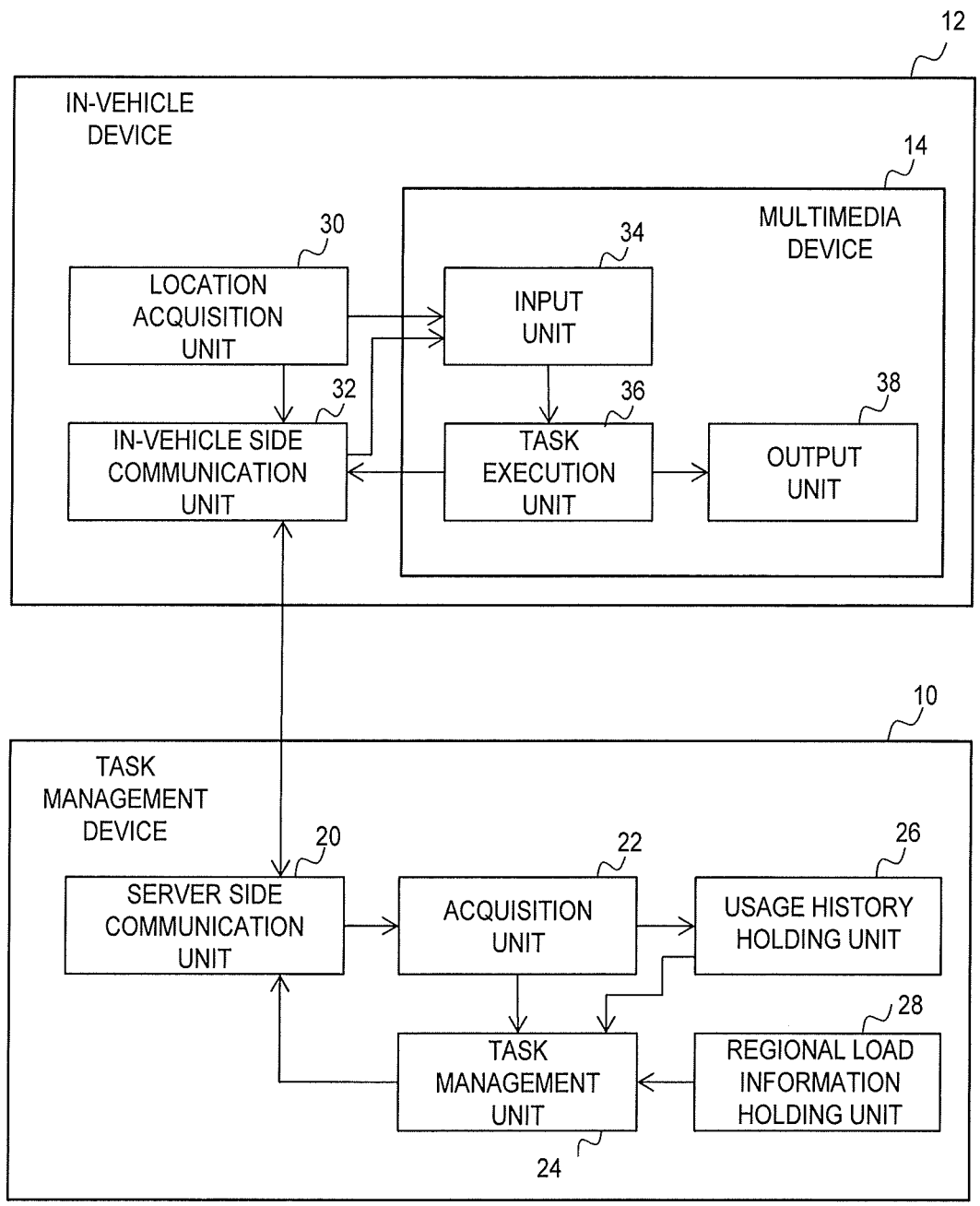
FIG. 2 is a diagram illustrating a functional configuration of the task management system.

FIG. 2 is a diagram illustrating a functional configuration of the task management system 1. In FIG. 2, each component stated as a functional block for performing various processing can be configured by a circuit block, a memory, and other LSIs in terms of hardware, or configured by a program loaded into the memory in terms of software. Therefore, it will be apparent to those skilled in the art that those functional blocks can be implemented in various forms by hardware only, software only, or a combination thereof, but not limited to any one of them.

The task management device 10 includes a server-side communication unit 20, an acquisition unit 22, a task management unit 24, a usage history holding unit 26, and a regional load information holding unit 28. The in-vehicle device 12 includes the multimedia device 14, a location acquisition unit 30, and an in-vehicle-side communication unit 32. The multimedia device 14 includes an input unit 34, a task execution unit 36, and an output unit 38.

The location acquisition unit 30 of the in-vehicle device 12 acquires location information of a host vehicle by a GPS or a transmission device provided on a road. The location information of the host vehicle is used by the multimedia device 14 for a navigation guidance function, a current location display function, and the like, and is transmitted to the task management device 10 by the in-vehicle-side communication unit 32. The location information of the host vehicle may be indicated by a latitude and a longitude, or may be indicated by a road ID. The road ID is information that can identify a road section, which may be acquired from the transmission device provided on the road, or may be derived from the latitude and the longitude.

The in-vehicle-side communication unit 32 transmits the vehicle information to the task management device 10, together with a vehicle ID so that the task management device 10 can identify the in-vehicle devices 12. Further, the in-vehicle-side communication unit 32 transmits information on the generated task. The information on the generated task is, for example, attribute information of a task scheduled to be executed or being executed. The attribute information of the task indicates that the task is for an application program of which media function. The in-vehicle-side communication unit 32 receives information on a task priority from the task management device 10.

The input unit 34 of the multimedia device 14 receives the vehicle information from the location acquisition unit 30, an in-vehicle sensor (not shown), an external device (not shown), and the like. The in-vehicle sensor transmits to the multimedia device 14 vehicle speed information, vehicle acceleration information, detected information from an obstacle detection sensor, and the like. The external device transmits, to the multimedia device 14, traffic information, such as beacon information and ETC information, and infrastructure information such as radio data.

Further, the input unit 34 also receives instruction information for setting the priority of the task from the task management device 10 via the in-vehicle-side communication unit 32. For example, the instruction information for setting the priority of the task defines the priority of each task executed by the multimedia device 14. The priority of the task may be a task execution order.

The task execution unit 36 executes the media functions by multitasking based on the input vehicle information. The task execution unit 36 sets the priority of the task, and executes the media function by executing the tasks based on the set priority. The task execution unit 36 sets the priority of the task based on the instruction information from the task management device 10.

The higher the priority, the more calculation resources for a calculation amount are allocated to the task, and the task is processed at a high calculation speed. The tasks may be set to have the same priority. The task execution unit 36 may allocate the calculation resource corresponding to the calculation amount of the task to the tasks set to have the same priority. In a case where a task has a higher priority but a smaller calculation amount, it is likely that less calculation resources are allocated to such a task than tasks with a lower priority even if the calculation resources increase. The task execution unit 36 allocates more calculation resources to the tasks with higher priorities, and when the task with the higher priority is completed, increases the priority of the tasks with the lower priority and allocates more resources to those resources. When the task with the higher priority is generated, the priorities of other tasks that are already calculating are lowered and less resources are allocated to those tasks. A small amount of resources may be allocated to a task with a very low priority, or, the processing of such a task may be suspended.

The task execution unit 36 acquires information indicating a load state of the multimedia device 14, for example, usage rates of the CPU and the memory, and transmits the acquired information indicating the load state of the multimedia device 14 to the task management device 10. Further, the task execution unit 36 transmits information indicating the task being executed to the task management device 10.

The output unit 38 includes a display, a speaker, an alarm device, and the like, and outputs information to the occupant in accordance with a result of the processing executed by the task execution unit 36.

The server-side communication unit 20 of the task management device 10 transmits and receives information to and from the in-vehicle-side communication unit 32. The acquisition unit 22 acquires the vehicle information and task information together with the vehicle ID from the in-vehicle device 12 via the server-side communication unit 20. The acquired vehicle information includes vehicle location information and a usage history of the media function used in the multimedia device 14. The usage history holding unit 26 holds the usage history of the media function in association with the vehicle ID.

The task management unit 24 derives priorities of tasks executed in the in-vehicle multimedia device 14 based on the task information and the vehicle information, and generates the instruction information for setting the priorities of the tasks. The task management unit 24 recognizes the tasks that are targets of the task management based on the task information, and derives priorities for the recognized tasks. Consequently, the priority of the task can be set appropriately in accordance with, for example, the driving environment of the vehicle.

The task management unit 24 derives the priority of the task based on the vehicle location information. The task management unit 24 derives the priority of the task based on the vehicle location information referring to a table held in the regional load information holding unit 28. The priority of the task derived by the task management unit 24 may vary depending on the location of the vehicle. For example, the regional load information holding unit 28 holds a table indicating a load level for each region.

Figures 3, 4:
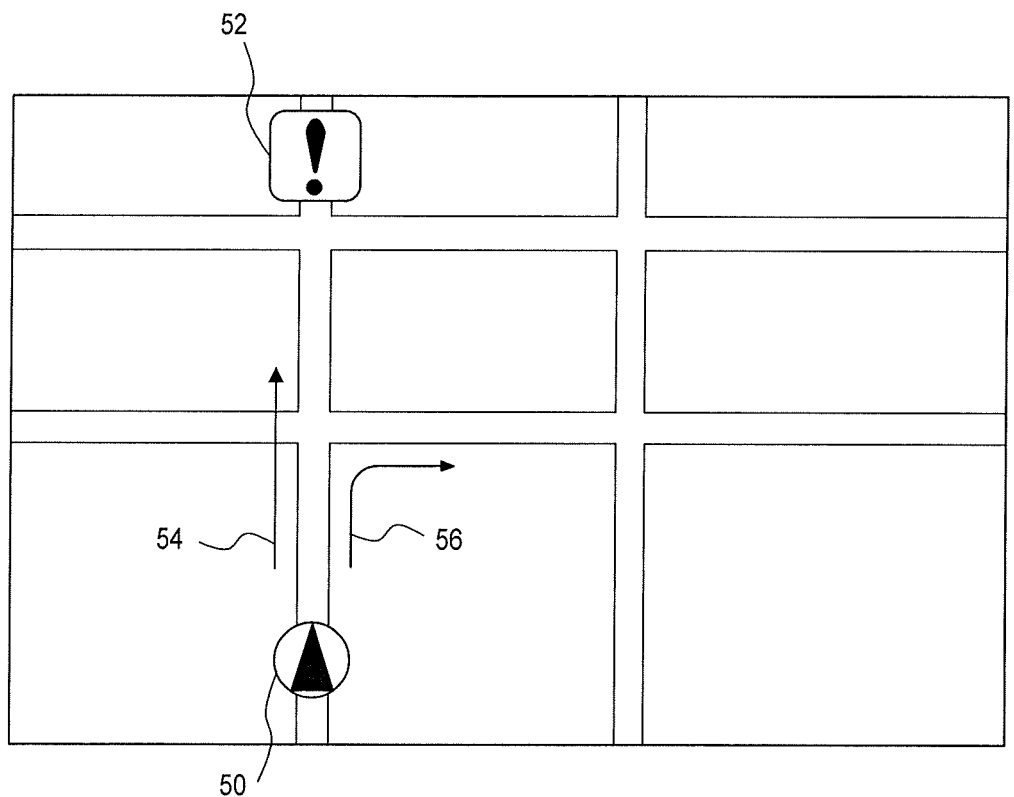
FIG. 3 is a diagram illustrating a relationship between a region held in a regional load information holding unit and a load magnitude.
FIG. 4 is a diagram illustrating a procedure of deriving a priority of a task in accordance with road conditions.

FIG. 3 is a diagram illustrating a relationship between a region held in the regional load information holding unit 28 and a load magnitude. As illustrated in FIG. 3, the load level is divided into several stages for each region, and varies depending on a time range. For example, a daytime load level is medium and a nighttime load level is low in a region A.

As the load level of the region where the vehicle is located is higher, the task management unit 24 increases the priority of the tasks of media functions related to driving (such as a function related to the traffic information, and a driving support function) and lowers the priority of the tasks of media functions related to entertainment (such as radio and audio). The task management unit 24 derives the priority of the task based on a table indicating a relationship between a task type and a priority in accordance with the load level in the region where the vehicle is located. Consequently, it is possible to appropriately set the priority of the task for each region. For example, the task related to the traffic information has a higher priority in a location where the interruption is frequently created by beacons, for example, in front of Tokyo Station. Therefore, the interruption communication can be processed quickly. It is possible to derive the priority of the task with margins in advance so that the task management unit 24 does not use up the calculation resources of the multimedia device 14, assuming that the interruption communication frequently occurs while traveling in a region with higher load level.

Referring to FIG. 2 again, the task management unit 24 may derive the priority of the task based on the vehicle location information and road condition information, such as traffic congestion information and traffic restriction information. The task management unit 24 periodically acquires the road condition information indicating road conditions, identifies a road where an abnormal event, such as an accident and traffic congestion, has occurred based on the road condition information, and derives the priority of the task for the vehicle located in the vicinity of the road such that the task of the function related to the traffic information has the higher priority.

The task management unit 24 derives a high-load region where the interruption communication occurs with higher frequency than a reference value based on a task usage status in the multimedia device 14 of each vehicle, and derives the priority of the task for the vehicle located in the high-load region such that the media function related to the traffic information has the higher priority. Consequently, a region with higher processing load can be identified based on the vehicle information of each vehicle, and the task management can be appropriately performed for the vehicle traveling in such a region. Further, at the time of a disaster, the task management unit 24 can set a higher task priority for the traffic information processing of the vehicle located within a predetermined region around a point where the disaster occurs.

FIG. 4 is a diagram illustrating a procedure for deriving the priority of the task in accordance with the road conditions. FIG. 4 illustrates a vehicle 50, a traffic restriction road 52 where traffic is restricted, a guided route 54 of the vehicle 50, and a suggested route 56 proposed to the vehicle 50. That is, the vehicle 50 is heading toward the traffic restriction road 52.

The task execution unit 36 of the multimedia device 14 receives the traffic information of the traffic restriction road 52 and changes the guided route 54 to the suggested route 56 so that the vehicle 50 bypasses the traffic restriction road 52 in the navigation function. The route is preferably proposed to the driver in a prompt manner, but destination change processing in the navigation function has very high processing load.

Therefore, the task management unit 24 extracts vehicles located around the road where the abnormal event has occurred based on the road information, and increases the priority of the task of a predetermined function, such as the navigation function, for the extracted vehicles. Consequently, the task management unit 24 can promptly set the priority of the task in accordance with the road conditions.

Returning to FIG. 2, the task management unit 24 derives the priority of the task based on the usage history of the media function of the multimedia device 14. The usage history of the media function of the in-vehicle device 12 is held in the usage history holding unit 26. The usage history holding unit 26 holds, for each vehicle, a usage history for each media function and a usage frequency for each media function calculated from the usage history.

The task management unit 24 extracts a media function with low usage frequency based on the usage history of the media function, and derives low priority for the task of the media function of which the usage frequency is a predetermined value or less. By lowering the priority of tasks with less usage history, other tasks can be executed preferentially. The usage frequency for each media function, and type and usage frequency of additional application software vary depending on a driver. Thus, the task management can be performed appropriately for each driver based on the usage history of the media functions.

The task management unit 24 may derive the priority of the task based on the vehicle location information and the usage history of the media function. Consequently, it is possible to set a higher priority for the media function with extremely high usage frequency based on the usage history of the media function, in the vehicle located in a region for which the media function related to the traffic information has the higher priority, thereby smoothly executing the tasks.

In a case where the vehicle is located in a region with a relatively higher load level, the task management unit 24 may derive a lower priority for a task of a media function of which a usage frequency is a predetermined value or less. In a case where the vehicle is located in a region with a relatively lower load level, the task management unit 24 may derive the priority of the task regardless of the usage history of the media function. Consequently, the priority of the task can be derived appropriately in accordance with the driving environment.

The server-side communication unit 20 transmits the instruction information indicating the priority of the task to the in-vehicle-side communication unit 32 of the in-vehicle device 12 in order to execute the task based on the priority derived by the task management unit 24. The task execution unit 36 sets the priority of the task based on the instruction information from the task management device 10 and allocates calculation resources to each task.

MODIFIED EXAMPLES

A modified example of the task management system 1 will be described. In the task management system of the modified example, the priority of task is derived on a side of the in-vehicle device 12, and the task management device 10 transmits the instruction information for adjusting the priority of the task. In the other words, the task management system according to the modified example derives the priority of the task on the side of the in-vehicle device 12, not on a side of the task management device 10.

The task management unit 24 of the task management device 10 according to the modified example generates, as the instruction information for setting the priority of the task, an instruction specifying that one or more media functions should have a higher priority, or an instruction specifying that one or more media functions should have a lower priority. For example, the task management unit 24 receives the vehicle location information as the vehicle information. In a case where, for example, a traffic restriction is imposed around the vehicle location, the task management unit 24 transmits to the vehicle the instruction information for increasing the priority of the navigation function or the like.

The instruction information for setting the priority of the generated task is transmitted to the input unit 34 of the multimedia device 14 via the server-side communication unit 20 and the in-vehicle-side communication unit 32.

The input unit 34 of the multimedia device 14 receives the instruction information for setting the priority of the task. The task execution unit 36 sets the priority of the task based on the instruction information for setting the priority of the task and a basic priority, and executes the media function by executing the tasks based on the set priority. The basic priority is set for the media functions in advance, and a table indicating a correlation between the basic priority and the media function is held. The basic priority is set so that media functions related to driving (such as a traffic information notification function and a driving support function) have higher basic priorities, and the media functions related to entertainment (such as radio and audio) have lower basic priorities. Tasks of the functions with higher basic priorities are processed preferentially.

The task execution unit 36 adjusts the basic priority based on the instruction information for setting the priority of the task, thereby deriving the priority of the task. Consequently, the priority of the task can be promptly adjusted by, for example, an instruction for increasing the priority of the navigation function in the vehicle which is traveling in a predetermined region due to traffic congestion, a traffic restriction, or the like.

It will be apparent to those skilled in the art that the embodiments are merely examples, various modifications can be made to combinations of the components, and such modifications also fall within the scope of the present disclosure.

What is claimed is:

1. A task management device comprising:
   circuitry configured to:
   acquire vehicle information from multiple vehicles including location information of the vehicles;
   generate instruction information for setting priorities of a plurality of tasks executed by an in-vehicle multimedia device disposed in each of a plurality of the vehicles travelling in a predetermined region of a plurality of different regions based on the location information; and
   transmit the generated instruction information to each of the in-vehicle multimedia devices, wherein
   resources of each of the in-vehicle multimedia devices are allocated for the tasks in accordance with the priorities,
   a load level is set for each of the plurality of different regions,
   when the predetermined region is a region having a first load level, the instruction information for setting the priorities of the tasks is generated such that a priority of a task of a media function related to driving is higher than a priority of a task of a media function related to entertainment,
   when the predetermined region is a region having a second load level that is lower than the first load level, the instruction information for setting the priorities of the tasks is generated such that the priority of the task related to driving is lower than the priority of the task related to entertainment,
   the task of the media function related to driving includes at least one of a traffic information function and a driving support function, and
   the task of the media function related to entertainment includes at least one of a radio function and an audio function.

2. The task management device according to claim 1, wherein the circuitry is configured to:
   derive the priorities of the plurality of tasks based on the vehicle information, and
   generate the instruction information based on the derived priorities of the tasks.

3. The task management device according to claim 1, wherein the circuitry is configured to:
   acquire a usage history of a media function of the multimedia devices,
   derive the priorities of the plurality of tasks based on the usage history of the media function of the multimedia devices, and
   generate the instruction information based on the derived priorities of the tasks.

4. The task management device according to claim 1, wherein the circuitry is configured to:
   allocate more of the resources of the in-vehicle multimedia devices to a task with a higher priority, and
   when the task with the higher priority is completed, increase the priority of a task with a lower priority and allocate more resources to the task with the lower priority.

5. The task management device according to claim 1, wherein the instruction information is generated for setting the priorities of the plurality of tasks executed by the in-vehicle multimedia devices based upon a time the plurality of the vehicles are travelling in the predetermined region.

6. The task management device according to claim 1, wherein the instruction information is generated for setting the priorities of the plurality of tasks executed by the in-vehicle multimedia devices by referring to a table storing the plurality of different regions, where each of the different regions is assigned a level load based upon a time of day.

7. The task management device according to claim 6, wherein each of the different regions is assigned a plurality of load levels based upon the time of day.

8. The task management device according to claim 7, wherein the instruction information is generated for setting the priorities of the plurality of tasks executed by the in-vehicle multimedia devices based upon a load level corresponding to a time the plurality of the vehicles are travelling in the predetermined region.

9. The task management device according to claim 6, wherein the instruction information is generated for setting the priorities of the plurality of tasks executed by the in-vehicle multimedia devices based upon a load level corresponding to a time the plurality of the vehicles are travelling in the predetermined region.

10. The task management device according to claim 1, wherein the circuitry is configured to:
- receive traffic information including a location of a traffic event; and
- generate the instruction information for setting the priorities of the plurality of tasks executed by the in-vehicle multimedia devices based on the location of the vehicles with respect to the location of the traffic event.

11. A task management method comprising:
- acquiring vehicle information from multiple vehicles including location information of the vehicles;
- generating instruction information for setting priorities of a plurality of tasks executed by an in-vehicle multimedia device disposed in each of a plurality of the vehicles travelling in a predetermined region of a plurality of different regions based on the location information; and
- transmitting the generated instruction information to each of the in-vehicle multimedia devices, wherein
- resources of each of the in-vehicle multimedia devices are allocated for the tasks in accordance with the priorities,
- a load level is set for each of the plurality of different regions,
- when the predetermined region is a region having a first load level, the generating the instruction information includes generating the instruction information for setting the priorities of the tasks such that a priority of a task of a media function related to driving increases and a priority of a task of a media function related to entertainment decreases,
- when the predetermined region is a region having a second load level that is lower than the first load level, the generating the instruction information includes generating the instruction information for setting the priorities of the tasks such that the priority of the task related to driving decreases and the priority of the task related to entertainment increases,
- the task of the media function related to driving includes at least one of a traffic information function and a driving support function, and
- the task of the media function related to entertainment includes at least one of a ratio radio function and an audio function.

\* \* \* \* \*